UNITED STATES PATENT OFFICE.

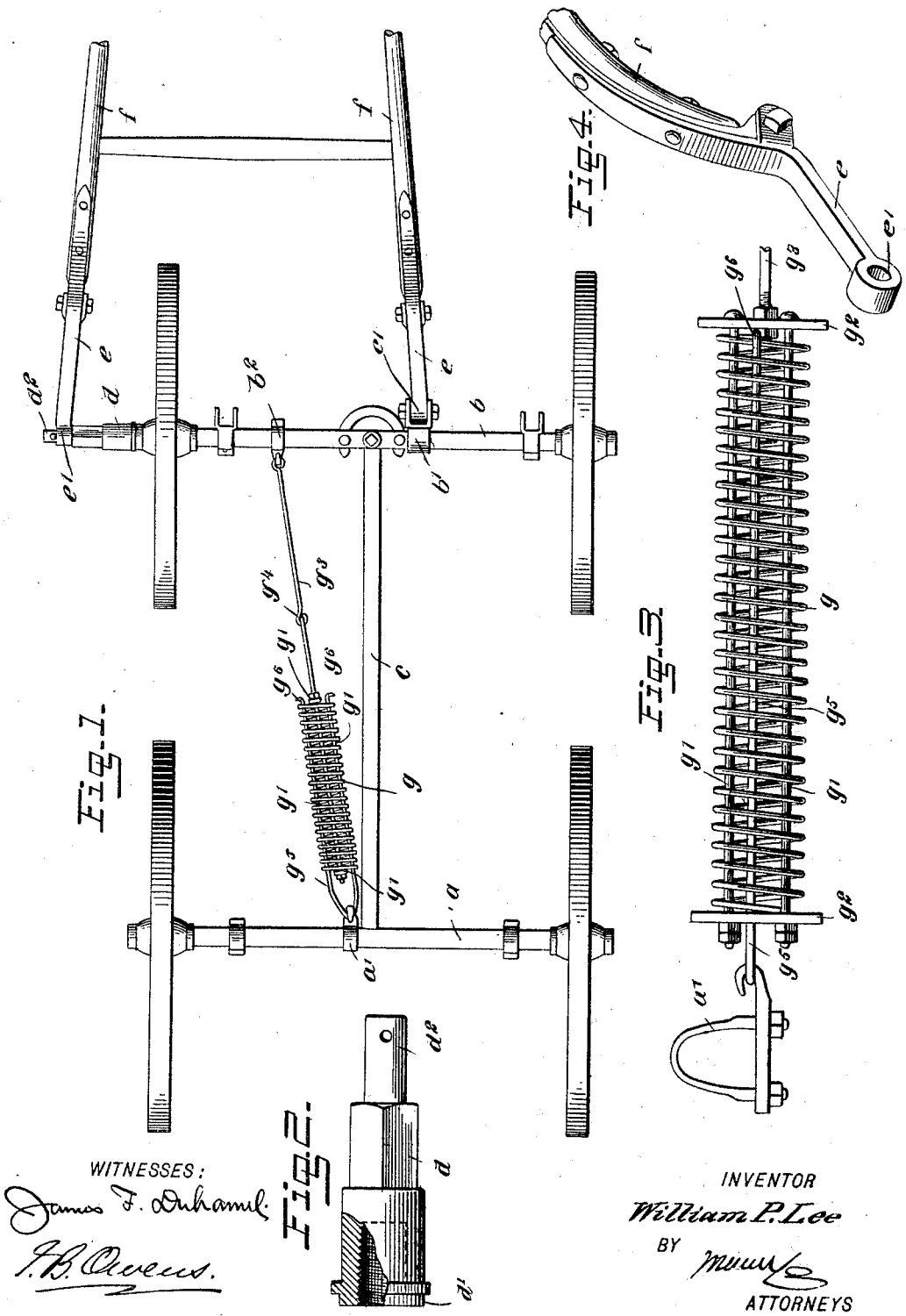

WILLIAM PHILANDER LEE, OF FAIRFAX, MINNESOTA.

VEHICLE ATTACHMENT.

SPECIFICATION forming part of Letters Patent No. 695,742, dated March 18, 1902.

Application filed May 20, 1901. Serial No. 61,074. (No model.)

*To all whom it may concern:*

Be it known that I, WILLIAM PHILANDER LEE, a citizen of the United States, and a resident of Fairfax, in the county of Renville and State of Minnesota, have invented a new and Improved Vehicle Attachment, of which the following is a full, clear, and exact description.

This invention has for its purpose to provide an attachment for single-horse vehicles which will enable the wheels to run in the beaten track of the road, but which at the same time will permit the single horse to travel at one side of the center of the road and in one of the beaten tracks made by a double team of horses.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a plan view of the invention. Fig. 2 is a detail section of the axle attachment. Fig. 3 is an enlarged detail view of the compensating spring for the front axle; and Fig. 4 is a view of one of the thill extensions, showing it attached to the thill.

In Fig. 1, $a$ indicates the rear axle, and $b$ the front axle, both of which are provided with wheels in the usual manner, and $c$ indicates the reach, which is joined to the front axle by a king-bolt, as usual. $d$ indicates an extension comprising a threaded socket $d'$, arranged to receive the threaded end of the spindle of the axle and which serves as the nut to hold in place the adjacent wheel. The extension $d$ also has a reduced outer portion $d^2$, and this is adapted to receive the eye $e'$ of one of the extensions $e$ of the thills $f$. A key or other suitable device may be fastened to the outer portion $d^2$ of the extension $d$ to hold the eye $e'$ in place. These extensions $e$ are fastened to the thills in any suitable manner and project rearward therefrom, so as to couple the thills forward of the position which they ordinarily occupy, thus allowing the whiffletree to lie forward of the front wheels of the vehicle. This arrangement of the thills with respect to the axle $b$ is best shown in Fig. 1. The other thill extension $e$ has its eye $e'$ fastened to a clip $b'$ of any form desired, which is secured to the front axle $b$. By this arrangement the thills are attached to the axle at one side of the longitudinal center of the vehicle, and by hitching the horse between the thills the horse may walk in the beaten track at one side of the road the same as though he were hitched in a double team. At the same time the vehicle itself will run in the wheel-tracks of the road. In order to compensate for the non-uniform draft which the thills thus arranged will transmit to the axle, I provide a spring $g$. This spring receives two or more longitudinally-extending rods $g'$, the ends of which project beyond the spring and are joined to cross-bars $g^2$. One of these cross-bars is adjustably connected with a rod $g^3$, which has a joint $g^4$ therein, which extends forwardly to the axle $b$ and is fastened thereto by a suitable clip or other device $b^2$. Extending within the spring $g$ are parallel rods $g^5$, which are connected to a clip $a'$, fastened to the axle $a$, substantially at the center thereof. These rods $g^5$ are provided with hooks $g^6$, which are arranged to engage the end of the spring $g$. The rods $g'$ are connected to the cross-bars $g^2$ through the medium of nuts on the rods, and by adjusting these nuts the pressure on the axle $b$ and the tension of the spring $g$ may be regulated and controlled at will. The clip $b^2$ is arranged on the axle $b$ considerably at one side of the middle thereof toward the extension $d$. Now it will be seen that when the strain of the horse is placed on the axle $b$ the slewing tendencies thereof will be encountered and resisted by the spring $g$, and the vehicle will be caused to move steadily and properly along its course.

Having thus described my invention, I claim as new and desire to secure by Letters Patent—

1. A vehicle having thills attached to the front axle at one side of the center thereof, and a compensating spring, one end of which is connected with the rear axle adjacent to the middle thereof and the other end of which is connected to the front axle at one side of its center, for the purpose specified.

2. The combination with a vehicle having a front and rear axle, of an extension fastened to one end of the front axle, said extension serving as a means of holding the adjacent wheel in place, thills attached to the front axle intermediate its ends and to the said axle extension outside of the adjacent wheel, and a connection between the rear and front axles said connection being attached to the front axle near the extension thereof.

In testimony whereof I have signed my name to this specification in the presence of two subscribing witnesses.

WILLIAM PHILANDER LEE.

Witnesses:
A. C. CARVER,
J. W. SCHRAMM.